United States Patent [19]
Nabae et al.

[11] 3,983,463
[45] Sept. 28, 1976

[54] METHOD AND APPARATUS FOR CONTROLLING THE SPEED OF INDUCTION MOTORS

[75] Inventors: Akira Nabae; Takeo Shimamura, both of Yokohama, Japan

[73] Assignee: Tokyo Shibaura Denki Kabushiki Kaisha, Japan

[22] Filed: Aug. 29, 1974

[21] Appl. No.: 501,783

[30] Foreign Application Priority Data
Aug. 31, 1973   Japan............................ 48-97242

[52] U.S. Cl............................. 318/227; 318/230; 318/231
[51] Int. Cl.².................................................. H02P 5/40
[58] Field of Search................... 318/227, 230, 231

[56] References Cited
UNITED STATES PATENTS

| | | | |
|---|---|---|---|
| 3,500,158 | 3/1970 | Landau et al. | 318/227 |
| 3,512,067 | 5/1970 | Landau | 318/227 |
| 3,529,223 | 9/1970 | Vergez, Jr. | 318/227 X |
| 3,593,083 | 7/1971 | Blaschke | 318/230 X |
| 3,718,847 | 2/1973 | Graf et al. | 318/230 X |
| 3,769,564 | 10/1973 | Rettig | 318/227 |

*Primary Examiner*—Gene Z. Rubinson
*Attorney, Agent, or Firm*—Stevens, Davis, Miller & Mosher

[57] ABSTRACT

In a method and apparatus for controlling the speed of an induction motor energized from a source of variable frequency, e.g. a controllable inverter, a control signal which is a function of the primary current of the induction motor is produced, a predetermined slip frequency pattern signal is generated in accordance with the control signal, and the source is controlled in accordance with the slip frequency pattern signal for controlling the operating frequency. By suitably determining the shape of the slip frequency pattern signal it is possible to operate the induction motor with either one of normal induction motor characteristic, DC series motor characteristic, DC shunt motor characteristic, DC weak field motor characteristic and DC compound motor characteristic, and to operate the induction motor for smooth and continuous power regeneration.

18 Claims, 24 Drawing Figures

METHOD AND APPARATUS FOR CONTROLLING THE SPEED OF INDUCTION MOTORS

BACKGROUND OF THE INVENTION

This invention relates to an improvement of the speed control system of an induction motor for driving a vehicle, for example, an electric motor car, or other loads requiring various speed-torque characteristics.

When compared with a direct current motor, since a cage type induction motor is advantageous in that is has small size, light weight, is not expensive, and is rugged and free from maintenance troubles, a variable speed drive system for an electric motor car which employs an induction motor combined with a controllable inverter has recently been developed.

Speed control systems for an induction motor are classified into two types, one the constant V/f control system (speed control system for an induction motor utilizing a so-called variable voltage, variable frequency inverter), and the other the constant fs control system wherein v represents the line voltage, f the line frequency and fs the slip frequency of the induction motor.

According to the constant V/f control system, as diagrammatically shown in FIG. 1, a rectifier 12 and an inverter 13 are connected in series between a source of alternating current 10 and an induction motor 11. Although any one of the many well known rectifiers and inverters may be used, such as a grid controlled mercury arc discharge device, with the recent development of power semiconductors such as the thyristor and power transistor it is advantageous to compose the rectifier 12 of bridge connected diodes or thyristor, and the inverter 13 with bridge connected thyristors. Since thyristors having a rating of 1300–2500V and 300–800 amperes are readily available on the market, a thyristor inverter is preferred for loads having relatively small value, for example an induction motor for driving a motor car. The control signal for the rectifier is generated by a circuit including a frequency setter 14, a frequency-voltage converter 15 which generates a voltage signal proportional to the input frequency, a current limiter 16 and a control voltage generator 17 which generates a gate pulse for the rectifier in response to the voltage signal. The frequency setter 14 is connected to the inverter 13 through a circuit including an oscillator 18 which varies its oscillation frequency in accordance with the setting of the frequency setter 14 and a frequency controller 19 which generates a gate pulse having a frequency determined by the output from the oscillator 18. As shown, the current limiter 16 is connected to the output of a current transformer CT connected on the primary side of the induction motor 11 for the purpose of limiting the primary current to a safe value.

As is recognized in the art, this control system provides a constant V/f control (constant magnetic flux) over a wide range of speed variation in which as the motor load varies the slip frequency is automatically varied in accordance with the characteristic of the motor, thus operating the motor under the steady state.

However, it is difficult to maintain the efficiency and the power factor of the motor always at high values because the slip frequency varies greatly with the load. Moreover, the starting characteristic of the motor is not good and stalling often occurs during transient conditions.

At the time of the regeneration operation (power regeneration or braking) the operating frequency of the oscillator 18 is decreased below the frequency corresponding to the synchronous speed of the motor to render the slip frequency fs negative. However, under such conditions, the slip frequency is not definite so that it is impossible to respond to a rapid load variation thus resulting in a hunting. As a result, it is impossible to provide a stable and continuous control.

According to the constant slip frequency (fs) control system it is possible to provide a DC series motor characteristic for an induction motor by controlling the slip frequency thereof to maintain it at a constant value. It is also possible to improve the efficiency and power factor of the motor over the constant V/f control system provided that the core of the motor is not saturated.

As shown in FIG. 2, a typical constant slip frequency control system comprises a rectifier 22 and an inverter 23 which are connected in series between a source of alternating current 20 and an induction motor 21. The output of a speed reference setter 24 is applied to the rectifier 22 through a circuit including a comparator 24c, a current limiter 25 and a control voltage generator 26. On the other hand, the output of a tachometer generator TG coupled to the induction motor 21 is applied to the inverter 23 through a circuit including a level adjuster 27 which converts the output of the tachometer generator TG into a frequency signal $f_n$ having a synchronous speed equal to the rotating speed $n$ of the motor, an adder 28 which adds the output of the level adjuster 27 to the output of a slip frequency setter $28s$ and a frequency controller 29 which converts the output of the adder into a gate pulse for controlling the inverter. As before, the current limiter 25 is set in accordance with the output of a current transformer CT connected on the primary side of the motor 21 and the output of the tachometer generator TG is also applied to comparator 24c.

According to this system, the frequency signal $f_n$ which utilizes the speed signal generated by the tachometer generator TG as the synchronizing signal is added to a definite slip frequency signal $f_s$, and a closed loop is formed with respect to frequency. The speed of the motor is varied by varying the output voltage V of rectifier 22.

Although this system is advantageous in that it can improve the starting characteristic, can eliminate the unstable phenomenon (stalling) during transients, and can improve the efficiency and power factor of the motor at a specific load corresponding to a selected slip frequency, it is inevitable that there will be a decrease in the power factor and efficiency for loads larger or smaller than the specific load according to the saturation of the motor.

When the constant slip frequency control is employed, the motor exhibits a characteristic similar to that of a direct current series motor but it is difficult to stably and continuously control the regeneration torque over the entire speed range for the same reason that the regenerative braking of a conventional DC series motor is difficult.

SUMMARY OF THE INVENTION

Accordingly, it is an object of this invention to provide an improved method and apparatus capable of controlling the speed of an induction motor over a wide range and over a wide load range with a high efficiency and power factor.

Another object of this invention is to provide an improved method and apparatus capable of operating an induction motor from a variable frequency source with either one of standard induction motor characteristic, DC series motor characteristic, DC shunt motor characteristic DC reduced field motor characteristic and DC compound motor characteristic with high efficiencies and power factors thereby widening the field of application of the induction motor.

Still another object of this invention is to provide a novel method and apparatus for controlling the speed of an induction motor which not only can operate the induction motor with a desired characteristic described above during the powering operation but also operate the induction motor for regenerating power continuously and smothly.

A further object of this invention is to provide a novel method and apparatus for operating the induction motor over a wide speed range at or near the maximum value of the torque coefficient.

A still further object of this invention is to provide a novel slip frequency pattern signal generator for enabling an induction motor to operate with any one of the operating characteristic described above. According to one aspect of this invention there is provided a method of controlling the speed of an induction motor which is energized from a source of variable frequency, which comprises the steps of producing a control signal which is a function of the primary current of the induction motor, generating a second signal having a predetermined slip frequency pattern in accordance with the control signal, and controlling the source in accordance with the second signal for controlling the operating frequency of the source.

According to another aspect of this invention, there is provided apparatus for controlling the speed of an induction motor which is energized from a source of variable frequency, which comprises means for producing a control signal which is a function of the primary current of the induction motor, means responsive to the control signal for generating a second signal having a predetermined slip frequency pattern, means responsive to the second signal for producing a variable frequency control signal, and means responsive to the variable frequency control signal for controlling the operating frequency of the source thereby operating the induction motor at or near the maximum value of the torque coefficient thereof.

Various types of slip frequency pattern signal generators may be used. For example, slip frequency signal generators respectively generating pattern signals for normal induction motor characteristic, DC series motor characteristic, DC shunt motor characteristic, DC weak field motor characteristic and DC compound motor characteristic may be used singly or selectively thus widening the field of applications of the induction motor.

For a certain application, for example, where the induction motor is used as a vehicle drive motor and where it is desired to regenerate power for dynamic braking or return it to the source, a special slip frequency pattern signal generator that assures stable and continuous power regeneration is used together with a slip frequency pattern signal generator which operates the motor with a desired speed-torque characteristic during the powering operation of the motor.

The control signal may be derived from a current transformer connected on the primary side of the induction motor. However, as will be described later, since the ratio $V/f$ is also a function of the primary current, such ratio can also be used as the control signal.

BRIEF DESCRIPTION OF THE DRAWINGS

The principle and operation of the invention can be more fully understood from the following detailed description taken in conjunction with the accompanying drawings in which:

FIG. 8b is a graph showing the relationship between the slip frequency and the primary current obtainable from the characteristics shown in FIG. 8a;

DESCRIPTION OF THE PREFERRED EMBODIMENTS

Figure 1:
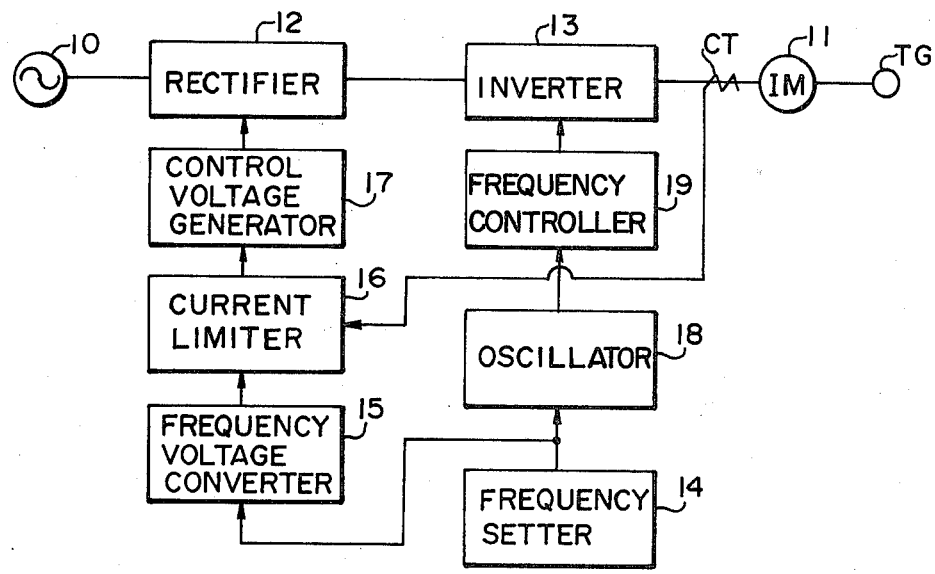
FIG. 1 is a block diagram showing a prior art constant $V/f$ control system.
Figure 2:
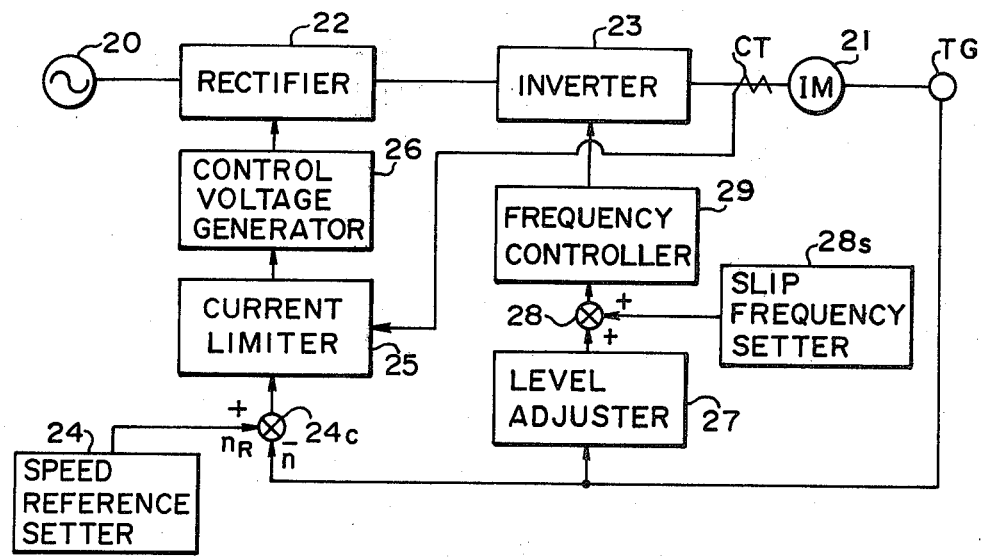
FIG. 2 is a block diagram showing a prior art constant slip frequency control system.
Figure 3:
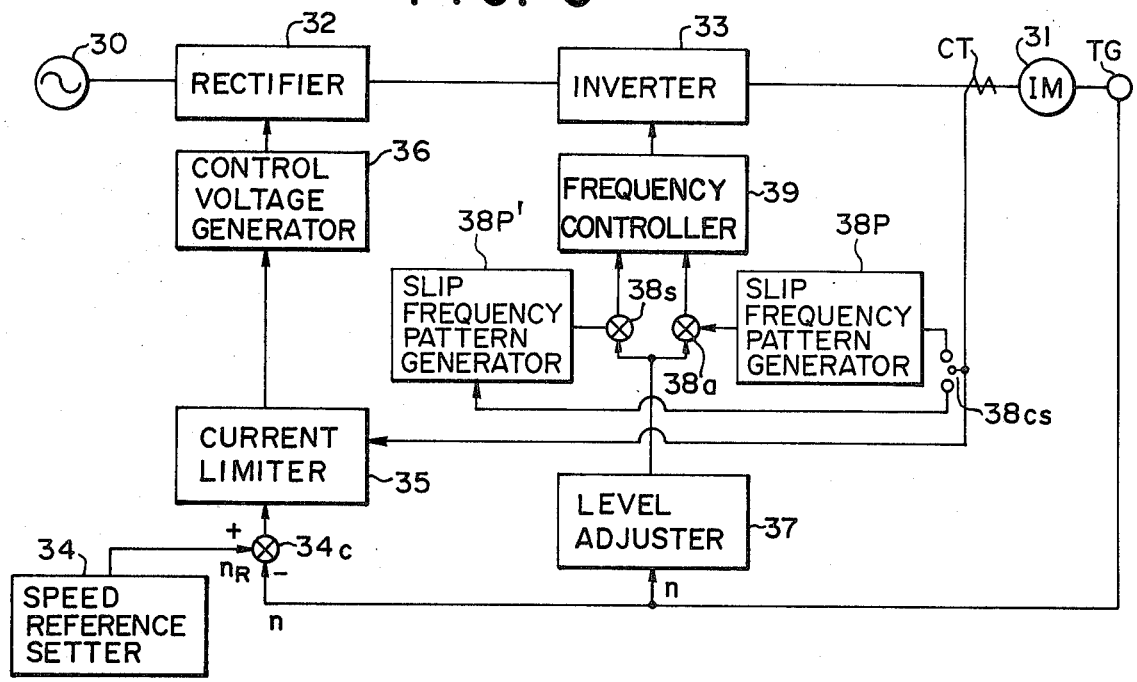
FIG. 3 is a block diagram of one example of the speed control system embodying the invention.

In a preferred embodiment of this invention shown in FIG. 3, a source of alternating current 30 is connected to a cage rotor type induction motor 31 through serially connected rectifier 32 and an inverter 33 which are identical to those shown in FIGS. 1 and 2. In the same manner as in FIG. 2, the output from a speed reference setter 34 is applied to the rectifier 32 via a circuit including a comparator 34c, a current limiter 35, and a control voltage generator 36. The output of the tachometer generator TG is applied to the comparator 34c and to a level adjuster 37, where the level of the output of the tachometer generator is adjusted to a predetermined level. The output of the level adjuster is supplied to an adder 38a and a subtracter 38s.

The output from a current transformer CT connected on the primary side of the induction motor is applied to the current limiter 35 and to the stationary contact of a powering-regeneration transfer switch 38cs. For powering operation, the transfer switch 38cs is thrown to the upper contact so that a signal $1_{fsp}$ generated by a first slip frequency pattern signal (fsp) generator 38p is added to the output $1_{fn}$ from the level adjuster 37 by adder 38a, and its output $1f = 1fn + 1_{fsp}$ is applied to the inverter 33 through a frequency controller 39. During the regeneration operation, the transfer switch 38cs is thrown to the lower contact so that the output $1fsp'$ from a second slip frequency pattern signal (fsp') generator 38p' is subtracted from the output $1_{fn}$ of the level adjuster 37 by subtracter 38s, and its output $1f = 1fn - 1fsp'$ is applied to the inverter 33 via frequency controller 39.

Before describing the operation of the speed control system shown in FIG. 3, the normal operation characteristic or the powering operation characteristic of an induction motor will be analyzed for the purpose of explaining the fact that when the slip frequency is set at or near a point at which the torque coefficient is a maximum, it is possible to operate the motor always at high efficiencies and high power factors over wide ranges of speed variation and load variation.

Figure 4:
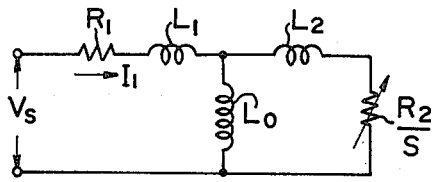
FIG. 4 shows the equivalent circuit of an induction motor.

The normal characteristic of an induction motor is generally represented by an equivalent circuit shown in FIG. 4 and the torque T is approximately expressed by the following equation 1, provided that the primary resistance $R_1$ is negligible.

$$T = \frac{m}{2\pi}p \frac{(R_2/f_s)(2\pi Lo)^2}{(R_2/f_s)^2 + (2\pi L_2 + 2\pi Lo)^2}|I_1|^2 \quad 1$$

In equation 1 and FIG. 4, $L_1$ represents the primary inductance, $L_2$ the secondary inductance reflected on the primary side, $Lo$ the inductance of the exciting circuit, $fs$ the slip frequency, $m$ the number of phases, $p$ the number of poles, $I_1$ the primary current, current and $Vs$ the source voltage.

When the primary frequency is denoted by $f$ the inductance of the exciting circuit $Lo$ can be expressed as a function of $Vs/f$ where the ratio $Vs/f$ is variable, thus $$Lo = F_1 [Vs/f] \quad 2$$

Substitution of equation 2 into equation 1 equation 3.

$$T = F_2[fs. Vs/f]|I_1|^2 \quad 3$$

The relationship among the primary current I, slip frequency fs and the ratio of the supply voltage and the primary frequency $Vs/f$ can be expressed as follows.

$$Vs/f = F_3 [fs \cdot |I_1|] \quad 4$$

From equation 3 and 4 we obtain $$T = F_4 [fs \cdot |I_1|] \quad 5$$

In equation 2 to 5, $F_1 - F_4$ are symbols representing functional relationships.

Figure 5:
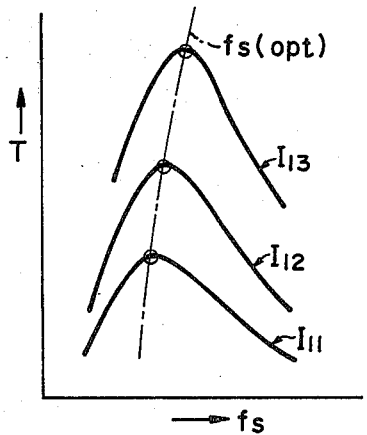
FIG. 5 is a graph showing the relationship between the torque and the slip frequency for various primary currents.

The results of calculations of equation 5 for various primary currents $I_{11}$, $I_{12}$ and $I_{13}$ are depicted in FIG. 5 in which the ordinate represents the torque T and the abscissa the slip frequency $fs$. Denoting the torque for a definite primary current $I_{1k}$ (where $k = 1, 2. —$ ), by $Tk$ (where $k = 1, 2 —$ ) and the torque coefficient by $K_k$ (where $k = 1, 2 —$ ), we obtain $$K_k = Tk/I_{1k} = F_5 [fs] \quad 6$$

which shows that the torque coefficient $K_k$ is a function of the slip frequency $fs$, and that a maximum torque exists at a certain value of the slip frequency $fs$.

Such maximum torque coefficient occurs because as the slip frequency $fs$ increases, secondary copper loss increases whereas as the slip frequency decreases, the magnetic core is saturated.

In FIG. 5 curve $fs$ (opt) (which means an optimum slip frequency) is obtained by depicting a plurality of torque-slip frequency curves for different primary currents $I_{11}$, $I_{12}$, $I_{13}$ — and by interconnecting the peaks of respective torque-slip frequency curves.

Figure 6A:
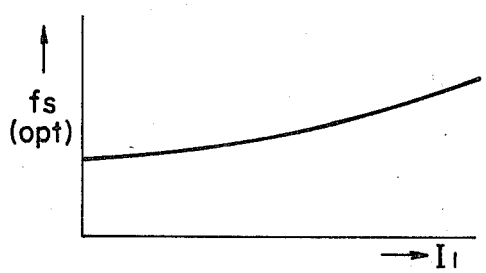
FIG. 6a is a graph showing the relationship between the slip frequency corresponding to the maximum torque coefficient and the primary current.

FIG. 6a is a graph showing the relationship between $fs$(opt) shown in FIG. 5 (ordinate) and the primary current $I_1$ (abscissa).

As a consequence, when controlling the slip frequency of an induction motor, if the slip frequency fs is pattern controlled to follow the curve $fs$(opt) shown in FIG. 5 in accordance with the primary current $I_1$, it would be possible to operate the induction motor always at the maximum torque coefficient irrespective of the value of the load of the induction motor or of the primary frequency thereby assuring high efficiency and high power factor operation.

The curve shown in FIG. 6a can be obtained either by a calculation utilizing the curves shown in FIG. 5 or actual measurement. By changing the $(fs - I_1)$ pattern it is possible to provide any one of the series, shunt, weak field and compound characteristics of an induction motor.

More particularly, in an induction motor only the relation expressed by equation 4 exists among three variables $v/f$, $|I_1|$ and fs so that it is possible to apply any desired functional relationship among two out of these three variables. For example, if a functional relation $$fs = F_6 [I] \quad 7$$

were assumed, and if the functional symbol $F_6$ were suitably selected, any one of the shunt, series, weak field and compound characteristics could be imparted to the induction motor.

It is herein defined that

| series characteristic | means | $T \propto I_1^2$ |
| shunt characteristic | means | $T \propto I_1$ and |
| compound characteristic | means | $T \propto I_1^n$ | where $2 > n > 1$

Thus, where the shunt characteristic is desired, in equation 3, by putting $$F_2 [fs. V/f] = k_1/|I_1| \quad 8$$

we obtain $$T = k_1/|I_1| \, |I_1|^2 = k_1 \, |I_1| \quad 9$$

Figure 6B:
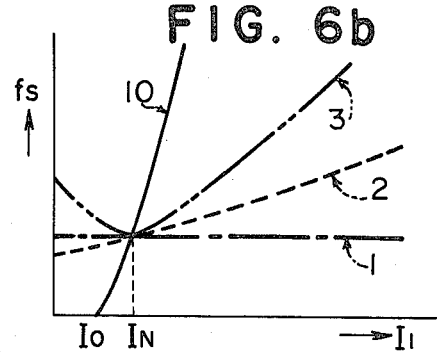
FIG. 6b is a graph showing the relationship between the slip frequency and the primary current for various operating characteristics of the induction motor.

Equation 9 shows a shunt characteristic. Further, by the concurrent solution of equations 4 and 8 for eliminating the term $V/f$, the relation of $(fs - I_1)$ can be obtained. FIG. 6b shows various relations between $fs$ and $I_1$ thus obtained in which curve 1 shows a constant fs characteristic, curve 2 shows a series characteristic in which the induction motor is controlled at a maximum value of the torque coefficient (this curve corresponds to the $fs$(opt) curve shown in FIG. 5), curve 3 shows a shunt characteristic, and curve 10 shows a characteristic for constant $V/f$ operation.

Figure 6C:
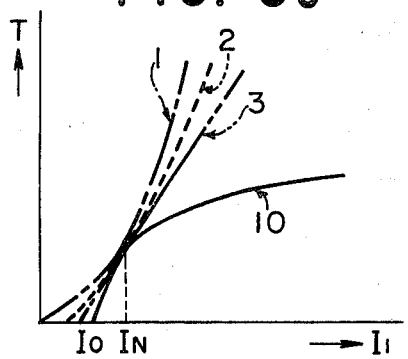
FIG. 6c is a graph showing the relationship between the torque and the primary current for the same operating characteristics as those shown in FIG. 6b.
Figure 6D:
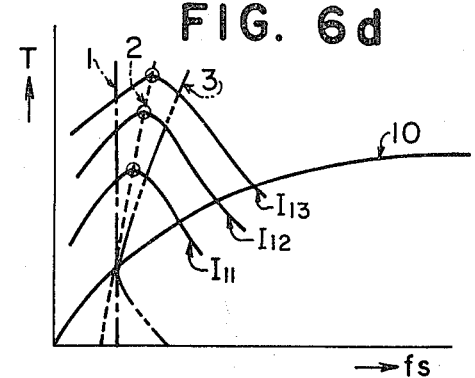
FIG. 6d is a graph showing the relationship between the torque and the slip frequency for the same operating characteristics as those shown in FIGS. 6b and 6c.
Figure 7A:
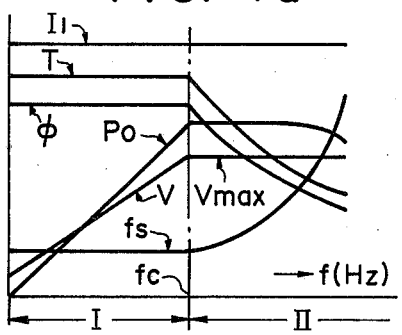
FIGS. 7a, 7b and 7c are graphs to explain various operating characteristics of the induction motor that can be provided by the invention during the powering operation thereof.
Figure 7B:
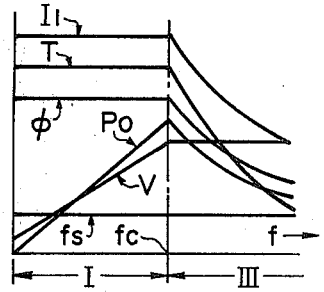
Figure 7C:
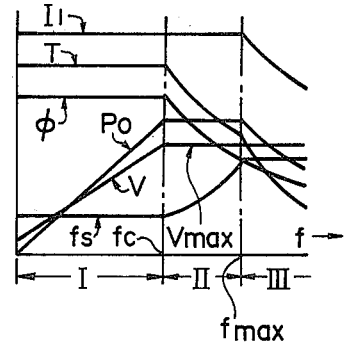

FIG. 6c shows a graph in which curves 1, 2, 3 and 10 shown in FIG. 6b are depicted in terms of the relation between torque T and the primary current $I_1$ and FIG. 6d shows a graph in which curves 1, 2, 3 and 10 shown in FIG. 6b are depicted in terms of the relation between the torque and the slip frequency. Theoretically constant fs characteristic curve 1 should be horizontal as shown in FIG. 6b or vertical as shown in FIG. 6d, but actually due to magnetic saturation the optimum slip frequency curve 2 inclines toward the right. FIG. 7a, 7b and 7c show the relationship between primary frequency $f$, primary current $I_1$, torque T, magnetic flux $\phi$, power output Po of the motor, primary voltage V and slip frequency fs under various operating conditions.

The operation thus far described is shown in the variable voltage variable frequency region I shown in FIG. 7a. In this region $I_1$ while the primary or supply voltage V and the primary frequency f are varied, the primary current $I_1$, torque T, flux $\phi$ and slip frequency fs are maintained constant. According to this invention, it is possible to operate the induction motor with a characteristic similar to that of a DC weak field motor by increasing the slip frequency with the increase in the primary frequency $f$ after the voltage has reached a maximum value Vmax, as shown by region II in FIG. 7a. In this case, the torque T and the magnetic flux $\phi$ decrease in reverse proportion to the primary frequency $f$, but the power output Po is maintained at a substantially constant value.

In a fixed voltage-variable frequency region III whown in FIG. 7b, when the slip frequency fs is controlled to be constant, the primary current $I_1$ decreases in reverse proportion to the primary frequency $f$, whereas as can be readily understood from equation 1, the torque T decreases in reverse proportion to the square of the primary frequency, thus providing a series characteristic for a DC motor. FIG. 7c shows a combination of the constant torque characteristic region I, the weak field characteristic region II (or shunt characteristic region) and the series characteristic region III. Thus, it will be clear that composite characteristics especially suitable for driving a vehicle can be produced by the selective operation of a plurality of slip frequency pattern signal generators which are designed to vary the slip frequency according to the patterns shown in various regions of FIGS. 7a, 7b and 7c.

According to this invention it is also possible to reverse the direction of phase rotation, that is the direction of rotation of the induction motor by merely switching the logical circuit of the control apparatus without switching the phase conductors of the main circuit.

A method of generating a pattern for operating an induction motor with any one of various operating characteristics will now be described with reference to FIGS. 7a, 7b and 7c, and FIGS. 8a, 8b and 8c.

During regeneration, if a constant slip frequency control is performed in a high speed region above $f = fc$, where $V = V$max, then the torque T decreases in proportion to $1/f^2$, so that the DC series motor characteristic is obtained as shown in region III, FIG. 7b. For the same reason, as the regenerative braking of a straight DC series motor is difficult, in the region III, if one tries to control the speed of the induction motor by maintaining the slip frequency at a definite value and by varying the ratio $V/f$, it would be difficult to stably and continuously control the regeneration torque because it is not always possible to obtain a stable solution (that is operating point).

Figure 8A:
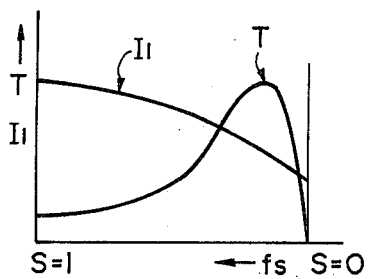
FIG. 8a shows conventional torque and current characteristic of an induction motor.
Figure 8B:
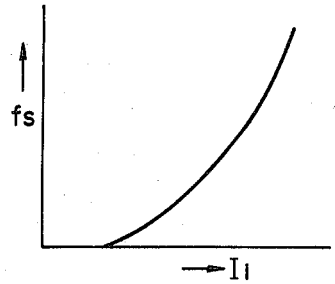

Considering a conventional torque (T) and primary current $(I_1)$ characteristic shown in FIG. 8a of an induction motor when it is operating under a definite voltage Vmax and a definite primary frequency $f$max, a $(fs - I_1)$ characteristic shown in FIG. 8b can readily be obtained from the characteristic of FIG. 8a by calculation, or experiment, for the purpose of using the $(fs - I_1)$ characteristic as a pattern.

Figure 8C:
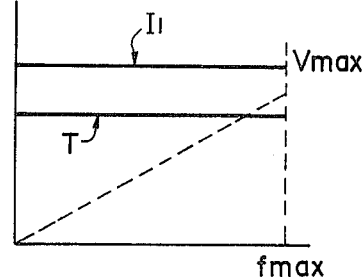
FIG. 8c shows a current and torque characteristic obtainable by using the pattern shown in FIG. 8b.

Thus, by using the $(fs - I_1)$ characteristic as a pattern over the entire frequency range (entire speed range), the $I_1$ and T characteristics as shown in FIG. 8c can be obtained, wherein $$V/f = V\text{max}/f\text{max} = \text{constant}.$$

It will be clear that if the slip frequency were varied in accordance with the variation of the primary current $I_1$, stable regeneration operation would be possible until $f$max is reached without forming an unstable series characteristic as shown in FIG. 7b.

Turning back to the operation of the embodiment shown in FIG. 3, the speed of the induction motor is controlled by varying the voltage and frequency by rectifier 32 and inverter 33. More particularly, when a source switch, not shown, connected between the source 30 and rectifier 32 is closed, rectifier 32 and inverter 33 operate to supply the power of voltage and frequency to the induction motor 31. Under these conditions the motor operates as a pure induction motor as shown in FIG. 8a. During the powering operation, when it is desired to operate the motor with a desired operating characteristic, powering-regeneration transfer switch 38cs is thrown to the upper side. The level of the speed signal $n$ generated by the tachometer generator TG is adjusted to a suitable value by the level adjuster 37 and is converted into a frequency signal $1_{fn}$ utilizing signal n as the synchronous speed. A slip frequency pattern signal $1_{fsp}$ produced by the first slip frequency pattern signal generator 38p in accordance with the current signal from CT is added to the frequency signal $1fn$ by adder 38a and the output $1_f = 1_{fn} + 1_{fsp}$ of the adder is converted into a variable frequency signal fi by frequency controller 39, which is applied to inverter 33.

The speed signal $n$ is compared with the speed reference signal $n_R$ generated by speed reference setter 34 by comparator 34c and the output of the comparator is sent to control voltage generator 36 for the rectifier 32 through current limiter 35. This control circuit controls the output voltage of therectifier by controlling the ignition angle thereof such that the output of the comparator is reduced to zero. Consequently, the induction motor is operated at a high efficiency and at a high power factor according to a slip frequency pattern provided by the slip frequency pattern signal generator 38p, and under the maximum torque coefficient calculated from the primary current.

For the regeneration operation, powering-regeneration transfer switch 38cs is thrown to the lower side so that the output $1_{fsp'}$ of the second slip frequency pattern signal generator 38p' is subtracted from the frequency signal $1_{fn}$ from level adjuster 37 by subtracter 38s, and the output $1f = 1fn - 1fnp'$ from the subtracter 38s is utilized to control the frequency of the inverter 33 by varying the frequency of the control voltage generated by frequency controller 39.

As can be noted from the foregoing description, if the inverter 33 were controlled in accordance with the characteristic shown in FIG. 8b (the second slip frequency pattern) which was obtained to generate regeneration torque, the speed of the induction motor could be stably and continuously controlled.

As has been described above, according to this invention, during the powering operation since the slip frequency of the induction motor is controlled to always exhibit the maximum torque coefficient in accordance with the primary current, it is possible to control the motor speed over a wide range and over a wide load range at a high efficiency and at a high power factor irrespective of the value of the load. Moreover, as the slip frequency is set to have the maximum torque coefficient irrespective of the primary frequency it is possible to provide a satisfactory characteristic as well as stabe operation without stalling. Further, during regeneration, as the slip frequency pattern is controlled in accordance with the primary current such that a regeneration torque is always produced it is possible to provide stable and continuous regeneration.

Instead of using a variable voltage, variable frequency source composed of a rectifier and an inverter, it is also possible to use a cyclo-converter.

The invention is also applicable to a system utilizing a rectifier-inverter power converting system in which the voltage and frequency applied to the induction motor are simultaneously varied by varying the frequency and the width of the control pulse applied to the inverter.

Figure 9A:
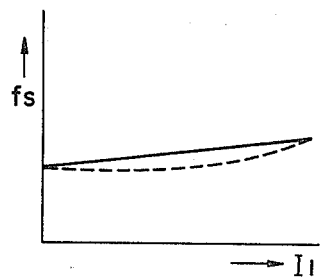
FIGS. 9a, 9b and 9c show modified slip frequency patterns that can be utilized in this invention.
Figure 9B:
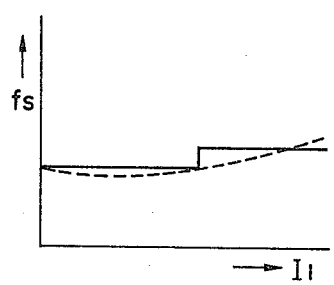
Figure 9C:
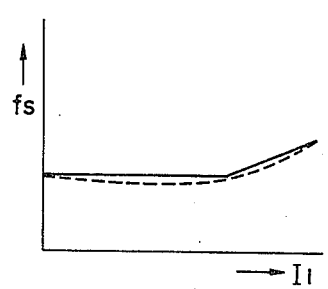

Although a slip frequency pattern shown by $fs$(opt) was used to control the induction motor according to a series characteristics and desired slip frequency pattern may be used according to the desired characteristic for the induction motor. For example, where slip frequency patterns as indicated by dotted lines shown in FIGS. 9a, 9b and 9c are desired, approximate characteristics may be obtained by using pattern signal generators that generate slip frequency patterns indicated by the solid polygonal lines.

Figure 10:
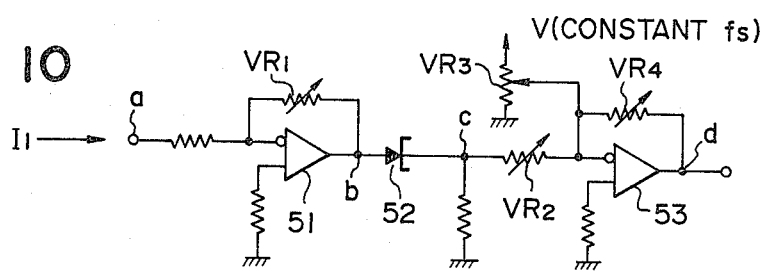
FIG. 10 is a connection diagram of one example of a slip frequency pattern signal generating circuit.

FIG. 10 shows one example of a slip frequency pattern signal generator 38p shown in FIG. 3, which comprises an input terminal a to which current signal $I_1$ is applied, a first operational amplifier 51 with a variable feedback resistor $VR_1$, a Zener diode connected to the output of amplifier 51 and a second operational amplifier 53 connected to the output of Zener diode 52 via a variable resistor $VR_2$. A fraction of the primary voltage V(at a constant slip frequency $fs$) is formed by a potentiometer resistor $VR_3$ and applied to one input of the second operational amplifier 53. This amplifier is also provided with a variable feedback resistor $VR_4$.

Figure 11A:
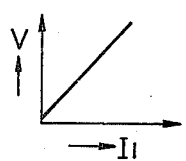
FIGS. 11a to 11d are graphs to explain the operation of the circuit shown in FIG. 10; and, FIG. 12 shows the connection diagram of a modified embodiment of the invention.
Figure 11B:
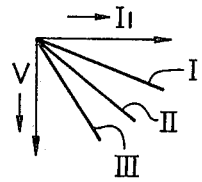
Figure 11C:
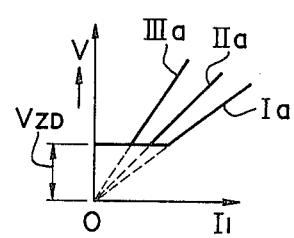
Figure 11D:
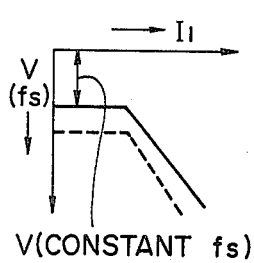

The slip frequency pattern signal generator shown in FIG. 10 operates as follows. The voltages or slip frequency pattern signals appearing at points a through d in FIG. 10 are shown by FIGS. 11a through 11d, respectively. Thus, the current signal $I_1$ applied to input termal a is linearly related to primary voltage V as shown in FIG. 11a. By varying the feedback resistor VR1, various curves I, II, III are produced by the first operational amplifier 51 at its output terminal b and by the cut off action of the Zener diode 52, various polygonal lines $I_a$ $II_1$ $III_a$ each comprising a horizontal segment and an inclined segment as shown in FIG. 11c are obtained. The variable resistor VR2 determines the inclination angles of respective inclined segments, whereas potentiometer resistor VR3 varies the magnitude V (at a constant slip frequency $fs$) as shown in FIG. 11d. In this manner, by suitable adjustment of resistors $VR_1$, $VR_2$ and $VR_3$, slip frequency pattern signals approximating the series, shunt, weak field, and compound characteristic of a DC motor can be readily produced.

Although the slip frequency pattern signal generator shown in FIG. 10 generates polygonal line pattern signals each comprising two segments intersecting at a point of inflection, polygonal line pattern signals of more complicated form that include more than two segments and two or more points of inflection can be formed by adding similar elements that form other segments which are serially connected to polygonal lines $I_a$, $II_a$ and $III_a$. Then it is possible to produce slip frequency pattern signals more closely resembling the series, shunt or compound operating characteristic.

Although in the embodiment shown in FIG. 3, a current signal produced by a current transformer was used to operate the slip frequency pattern signal generator 38p, as can be noted from equation 4 the ratio $Vs/f$ is a function of primary current $I_1$. Accordingly, instead of using a ($fs$ $I_1$) pattern signal generator, it is also possible to use a pattern signal generator which generates a ($fs - Vs/f$) pattern.

Figure 12:
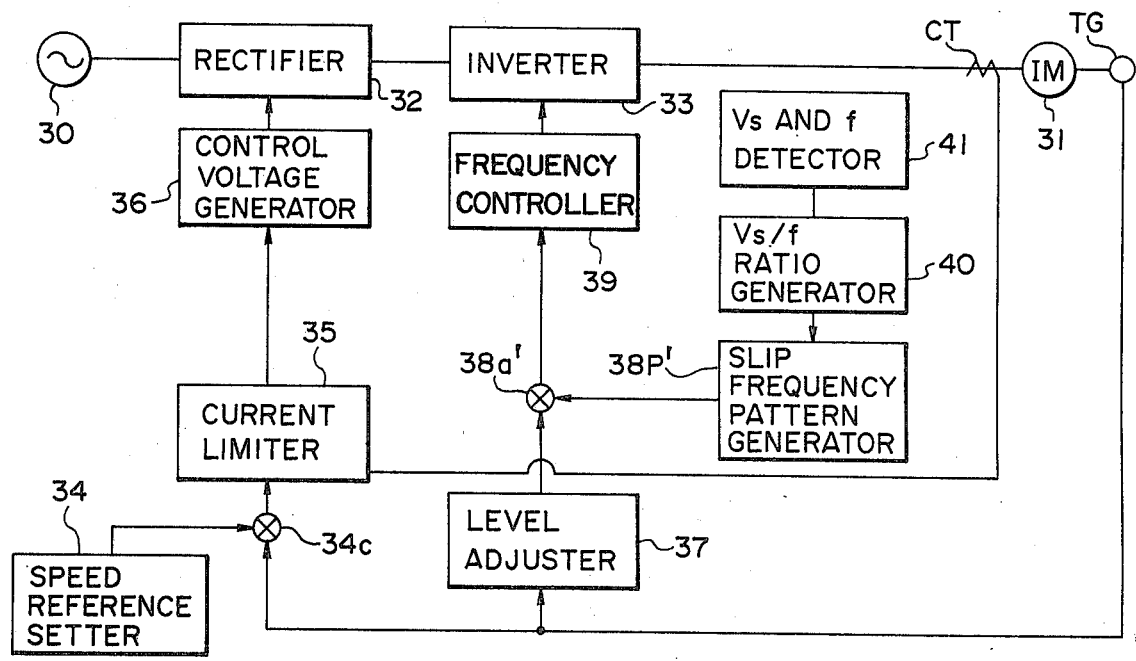

FIG. 12 shows a connection diagram of such modified embodiment in which circuit elements identical to those shown in FIG. 3 are designated by the same reference charactors for the purpose of simplifying the description. The circuit shown in FIG. 12 is different from that shown in FIG. 3 only in that a slip frequency pattern signal generator 38'p is controlled in accordance with the ratio $Vs/f$ produced by a $Vs/f$ ratio generator 40 connected to a detector 41 for detecting the source voltage $Vs$ and the source frequency $f$. It will be clear that the slip frequency pattern signal generator 38'p may be constructed similar to that shown in FIG. 10.

What is claimed is:

1. In a method of controlling the speed of an induction motor which is energized from a source of variable frequency, the improvement which comprises the steps of producing a control signal which is a function of the primary current of said induction motor, generating a second signal having a predetermined slip frequency pattern in accordance with said control signal, generating a frequency signal proportional to the speed of said induction motor, producing a variable frequency control signal corresponding to the algebraic sum of said frequency signal and said second signal, and controlling said source in accordance with said variable frequency control siganl for controlling the operating frequency of said source thereby operating said induction motor at or near the maximum value of the torque coefficient thereof.

2. The method according to claim 1 wherein said control signal is directly proportional to the primary current of said induction motor.

3. The method according to claim 1 wherein said control signal corresponds to the ratio of the source voltage to the source frequency which is expressed by the equation $$Vs/f = F_3 [fs, |I_1|]$$

where Vs represents the source voltage, $f$ the source frequency, $fs$ the slip frequency and $I_1$ the primary current of the induction motor.

4. The method according to claim 1 wherein said second signal is shaped to provide a DC series motor characteristic for said induction motor.

5. The method according to claim 1 wherein said second signal is shaped to provide a DC shunt motor characteristic for said induction motor.

6. The method according to claim 1 wherein said second signal is shaped to provide a DC compound motor characteristic for said induction motor.

7. The method according to claim 1 wherein said source of variable frequency comprises a controllable inverter, and wherein said method further comprises the steps of detecting the speed of said induction motor for producing a speed signal, converting said speed signal into a frequency signal, adding said frequency signal to said second signal to obtain a sum signal, generating an inverter control signal in accordance with said sum signal, and controlling said inverter in accordance with said inverter control signal thereby controlling the speed of said induction motor in accordance with a predetermined speed-load characteristic during the powering operation of said induction motor.

8. The method according to claim 1 wherein said source of variable frequency comprises a controllable inverter, and wherein said method further comprises the steps of detecting the speed of said induction motor for producing a speed signal, converting said speed signal into a frequency signal, subtracting said second signal from said frequency signal to obtain a difference signal, generating an inverter control signal in accordance with said difference signal, and controlling said inverter in accordance with said inverter control signal thereby controlling the speed of said induction motor in accordance with a predetermined speed-load characteristic during the regeneration operation of said induction motor.

9. The method according to claim 1 wherein said second signal represents a slip frequency pattern which is obtained by depicting a plurality of torque-current curves for different primary currents of said induction motor, and depicting a line through the peaks of respective torque-current curves.

10. In apparatus for controlling the speed of an induction motor which is energized from a source of variable frequency, the improvement which comprises means for producing a control signal which is a function of the primary current of said induction motor, means responsive to said control signal for generating a second signal having a predetermined slip frequency pattern, means for generating a frequency signal proportional to the speed of said induction motor, means for producing a variable frequency control signal corresponding to the algebraic sum of said frequency signal and said second signal, and means responsive to said variable frequency control signal for controlling the operating frequency of said source thereby operating said induction motor at or near the maximum value of the torque coefficient thereof.

11. The apparatus according to claim 10 wherein said means for producing said control signal comprises a current transformer connected on the primary side of said induction motor so that said control signal is directly proportional to the primary current of said induction motor.

12. The apparatus according to claim 10 wherein said means for producing said control signal comprises means for producing a signal which corresponds to the ratio of the source voltage to the source frequency which is expressed by the equation.

$$Vs/f = F_3 [fs, |I_1|]$$

where Vs represents the source voltage, $f$ the source frequency, $fs$ the slip frequency and $I_1$ the primary current of the induction motor.

13. In apparatus for controlling the speed of an induction motor which is energized by a source of variable frequency, means for generating a frequency control signal having a predetermined slip frequency pattern and used to control said source, said means comprising a first slip frequency pattern signal generator, a second slip frequency pattern signal generator, and transfer switch means for causing said first slip frequency pattern signal generator to respond to a second control signal which is a function of the primary current of said induction motor during the powering operation of said induction motor and for causing said second slip frequency pattern signal generator to respond to said second control signal during the regeneration operation of said induction motor.

14. The control apparatus according to claim 13 wherein the first slip frequency pattern signal is shaped to operate said induction motor at or near the maximum value of the torque coefficient thereof during the powering operation of said induction motor, and the second slip frequency pattern signal is shaped to operate said induction motor to produce a stable regeneration torque during the regeneration operation thereof.

15. The control apparatus according to claim 13 wherein said source of variable frequency comprises a controllable inverter, and wherein said apparatus further comprises means responsive to the speed of said induction motor for producing a speed signal, means for converting said speed signal into a frequency signal, an adder for adding said frequency signal to the output of said first slip frequency pattern signal generator, a subtracter for subtracting the output of said second slip frequency pattern signal generator from said frequency signal, means for generating a variable frequency control signal in accordance with the outputs of said adder and said subtracter, and means for controlling the operating frequency of said inverter in accordance with said variable frequency control signal.

16. The apparatus according to claim 10 wherein said means for generating said second signal comprises a first functional amplifier responsive to said control signal for producing an inclined line segment voltage which intersects a line segment voltage representing said conrol signal with a predetermined angle, and a Zener diode for cutting off the portion of said inclined line segment voltage below a predetermined value thereby forming a polygonal line.

17. The apparatus according to claim 16 wherein said first functional amplifier includes a variable feedback circuit which varies the inclination angle of said inclined line segment voltage with respect to said line segment voltage thereby forming a slip frequency pattern signal resembling either one of series, shunt and compound characteristics of a DC motor.

18. The apparatus according claim 16 which further comprises a second functional amplifier connected to the output of said Zener diode through a variable resistor and a potentiometer for applying a predetermined fraction of the source voltage to the input of said second operational amplifier, said variable resistor varying the inclination angle of said polygonal line segment voltage after the point of inflection thereof and said potentiometer varying the V at a constant slip frequency.

* * * * *